(12) United States Patent  
Fairhead

(10) Patent No.: US 7,575,075 B2  
(45) Date of Patent: Aug. 18, 2009

(54) TRACKED VEHICLE

(76) Inventor: Ryan Fairhead, 47 Mansfield St., Brampton, Ontario (CA) L6S 2X8

( * ) Notice: Subject to any disclaimer, the term of this patent is extended or adjusted under 35 U.S.C. 154(b) by 337 days.

(21) Appl. No.: 11/702,596

(22) Filed: Feb. 6, 2007

(65) Prior Publication Data

US 2008/0128183 A1 Jun. 5, 2008

(51) Int. Cl.
*B62D 11/00* (2006.01)
(52) U.S. Cl. .................. 180/6.7; 180/6.48; 180/6.5
(58) Field of Classification Search .................. 180/6.7, 180/6.48, 6.5, 9.28, 9.3, 9.44, 9.46, 9.5, 9.62, 180/9.1, 9.23
See application file for complete search history.

(56) References Cited

U.S. PATENT DOCUMENTS

| | | | | |
|---|---|---|---|---|
| 2,625,229 | A * | 1/1953 | Voorhees | 180/181 |
| 6,435,290 | B1 * | 8/2002 | Justus et al. | 180/9.1 |
| 6,691,806 | B2 * | 2/2004 | Wolfgang et al. | 180/6.7 |
| 6,866,108 | B2 * | 3/2005 | Borgwarth et al. | 180/9.42 |
| 7,086,490 | B2 * | 8/2006 | Haringer | 180/9.1 |
| 7,475,751 | B2 * | 1/2009 | Pard et al. | 180/190 |
| 2008/0277172 | A1 * | 11/2008 | Ben-Tzvi et al. | 180/9.1 |

* cited by examiner

*Primary Examiner*—Paul N Dickson
*Assistant Examiner*—Tashiana Adams
(74) *Attorney, Agent, or Firm*—Elias Borges

(57) ABSTRACT

The present invention is an improved personal tracked vehicle consisting of a platform pivotally mounted on top of a housing, the platform having a right and left side and a central axis. The platform is pivotally movable between a first position wherein the right side of the platform is below the left side of the platform and a second position wherein the left side of the platform is below the right side of the platform. The platform has a forward portion, a rearward portion and middle portion between the two, the middle portion being arched upwardly. The vehicle further includes a pair of parallel right and left tracks mounted to the housing below the platform, the right track being coupled to a right track transmission and the left track being coupled to a left track transmission, the right and left track transmissions both being coupled to a motor for driving the transmissions. The right and left track transmissions are operatively coupled to the platform such that when the platform is pivoted towards its first position, the left track is driven faster and the right track is driven slower, and when the platform is pivoted towards its second position, the right track is driven faster and the left track is driven slower, the platform being biased towards a central position wherein the left and right drives operate at the same speed. The motor of the vehicle is mounted to the housing below the middle portion of the platform and between the tracks.

20 Claims, 8 Drawing Sheets

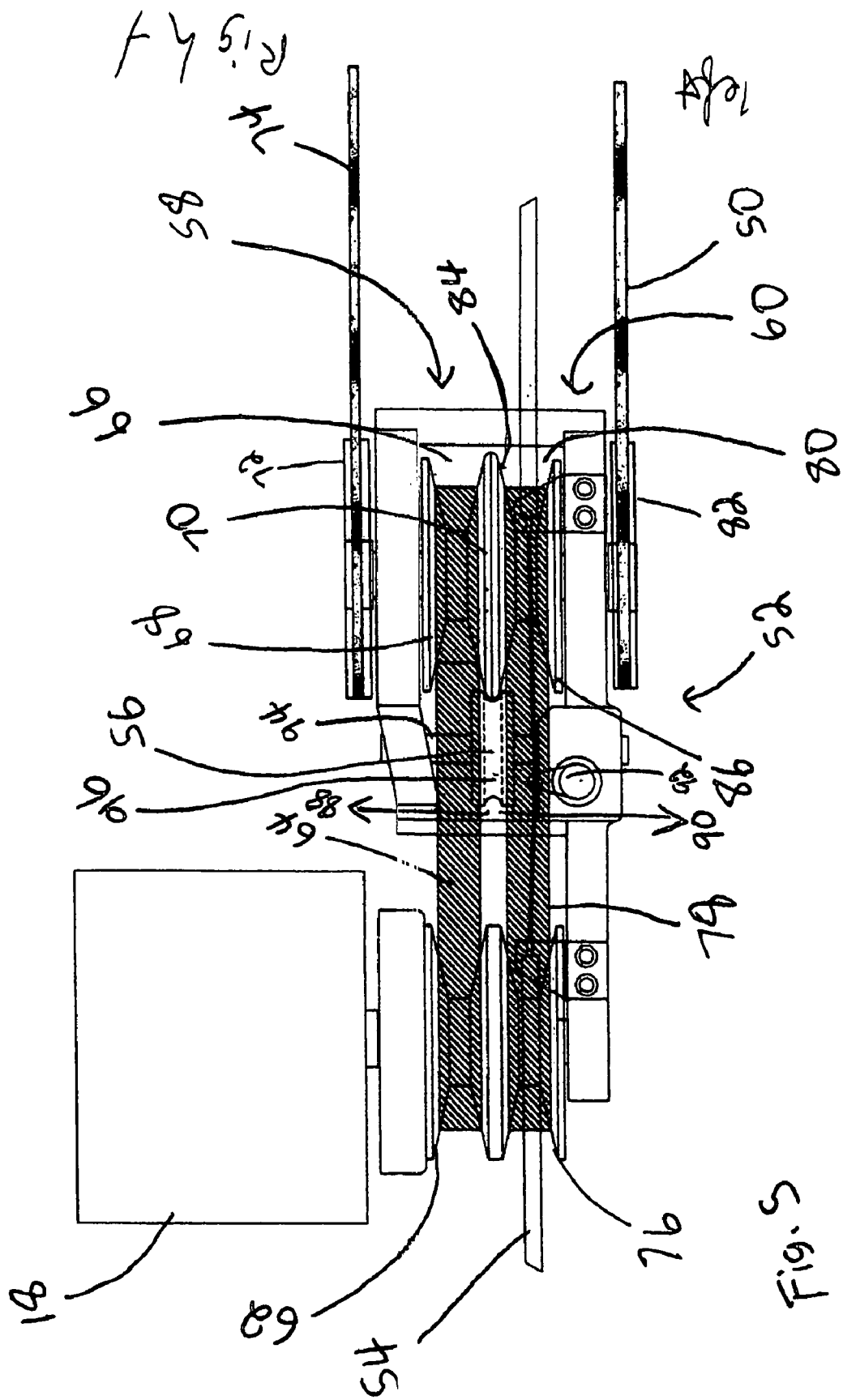

TRACKED VEHICLE

FIELD OF THE INVENTION

The invention relates generally to personal tracked vehicles of the type having a pair of motor driven caterpillar type tracks.

BACKGROUND OF THE INVENTION

Personal caterpillar tracked vehicles have been proposed in the past. For example, U.S. Pat. No. 5,305,846 to Martin discloses a personal tracked vehicle for use by an individual consisting of a pair of caterpillar tracks mounted below a platform upon which the user stands. The operation of the vehicle, including the steering of the vehicle by changing the relative speeds at which the tracks are driven, is controlled by a hand operated control.

While the track vehicle disclosed by Martin may be possible to construct, it suffers from several drawbacks. Firstly, the hand operated control can be awkward to manipulate. Furthermore, the device is not very stable due to the fact that the motor is mounted behind and above the platform upon which the user stands. An improved personal tracked vehicle is therefore required.

SUMMARY OF THE INVENTION

In accordance with one aspect of the present invention, there is provided an improved personal tracked vehicle consisting of a platform mounted on top of a housing, the platform having a front and a rear end, a right and left side and a central axis. The platform is pivotally mounted to the housing along the axis and pivotally movable between a first position wherein the right side of the platform is below the left side of the platform and a second position wherein the left side of the platform is below the right side of the platform. The platform has a forward portion, a rearward portion and middle portion between the two, the middle portion being arched upwardly. The vehicle further includes a pair of parallel right and left tracks mounted to the housing below the platform, the right track being coupled to a right track transmission and the left track being coupled to a left track transmission, the right and left track transmissions both being coupled to a motor for driving the transmissions. The right and left track transmissions are operatively coupled to the platform such that when the platform is pivoted towards its first position, the left track is driven faster and the right track is driven slower, and when the platform is pivoted towards its second position, the right track is driven faster and the left track is driven slower, the platform being biased towards a central position wherein the left and right drives operate at the same speed. The motor of the vehicle is mounted to the housing below the middle portion of the platform and between the tracks.

It is a further object of the invention to provide a vehicle as described above wherein the left and right transmissions are continuously variable transmissions capable of driving their respective tracks at different speeds, and further including a differential coupled to the right and left transmissions for controlling the relative speed of the tracks, the differential operating between a right bias wherein the right track is driven faster than the left track and a left bias wherein the left track is driven faster than the right track, the differential being operatively coupled to the platform.

It is a further object of the invention to provide a vehicle as described above wherein the right transmission includes a first pulley having a variable diameter coupled to the motor by a first belt, the first pulley in turn being coupled to the right track and wherein the left transmission includes a second pulley having a variable diameter coupled to the motor by a second belt, the second variable diameter pulley in turn being coupled to the left track, and wherein the differential controls the relative diameters of the first and second pulleys.

It is a further object of the invention to provide a vehicle as described above wherein the first and second pulleys consist of a first and second pair of opposing cones, respectively, the first and second pulleys being coaxially aligned and adjacent to one another such that one cone of each pulley are adjacent, and wherein the differential includes a member physically coupled to said one cone of each pulley, the differential being selectively movable between a first and second position corresponding to the differential's left and right biases, respectively.

It is a further object of the invention to provide a vehicle as described above wherein the member is coupled to the platform by a cable, the cable moving the member between the member's first and second position in response to the movement of the platform between the platform's first and second positions, respectively.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention.

DESCRIPTION OF THE DRAWINGS

FIG. 5. is a top view of the track drive mechanisms of the vehicle shown in FIG. 1.

In the drawings like characters of reference indicate corresponding parts in the different figures.

DETAILED DESCRIPTION OF THE INVENTION

Figure 1:
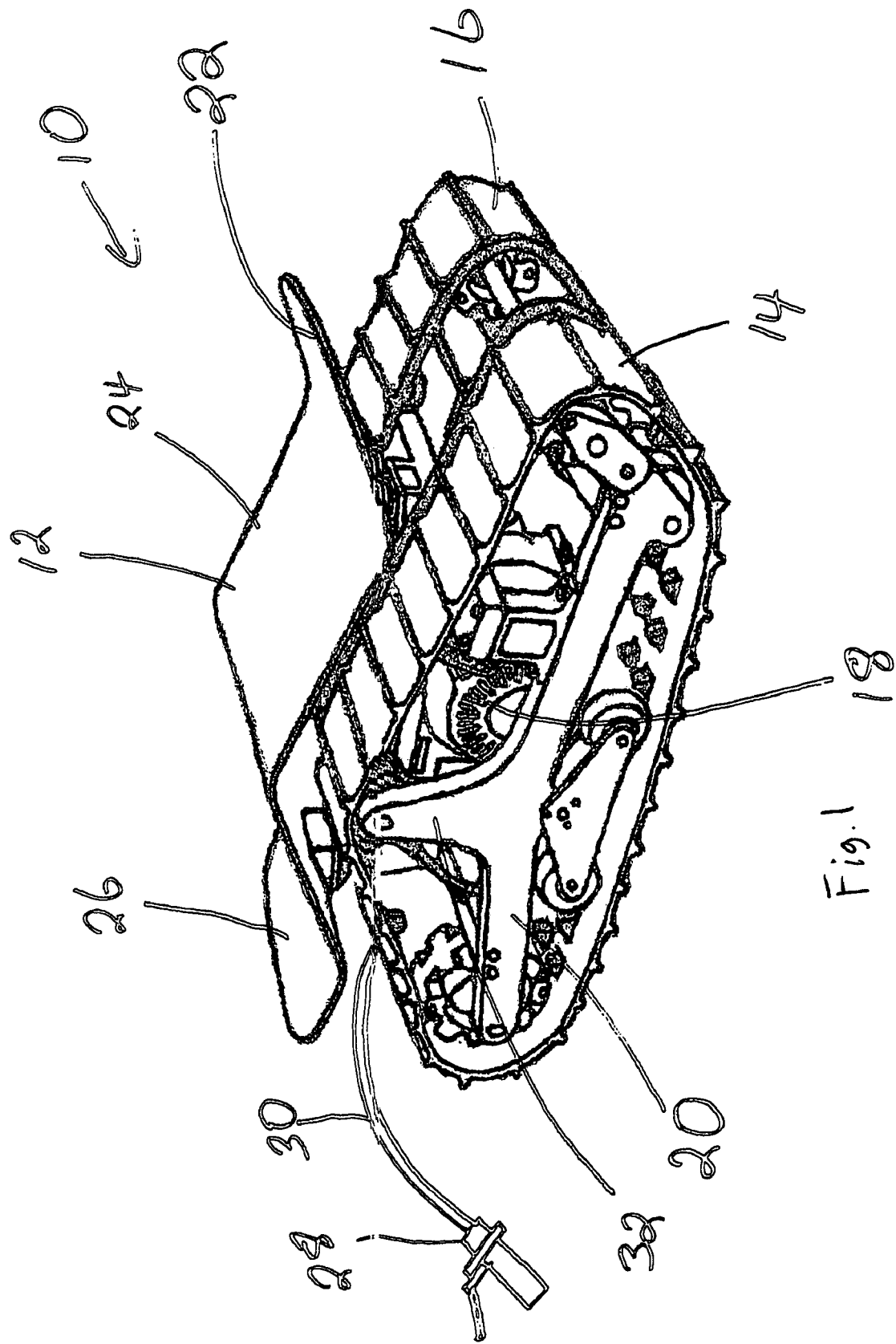
FIG. 1. is a perspective view of a personal tracked vehicle made in accordance with the present invention.
Figure 2:
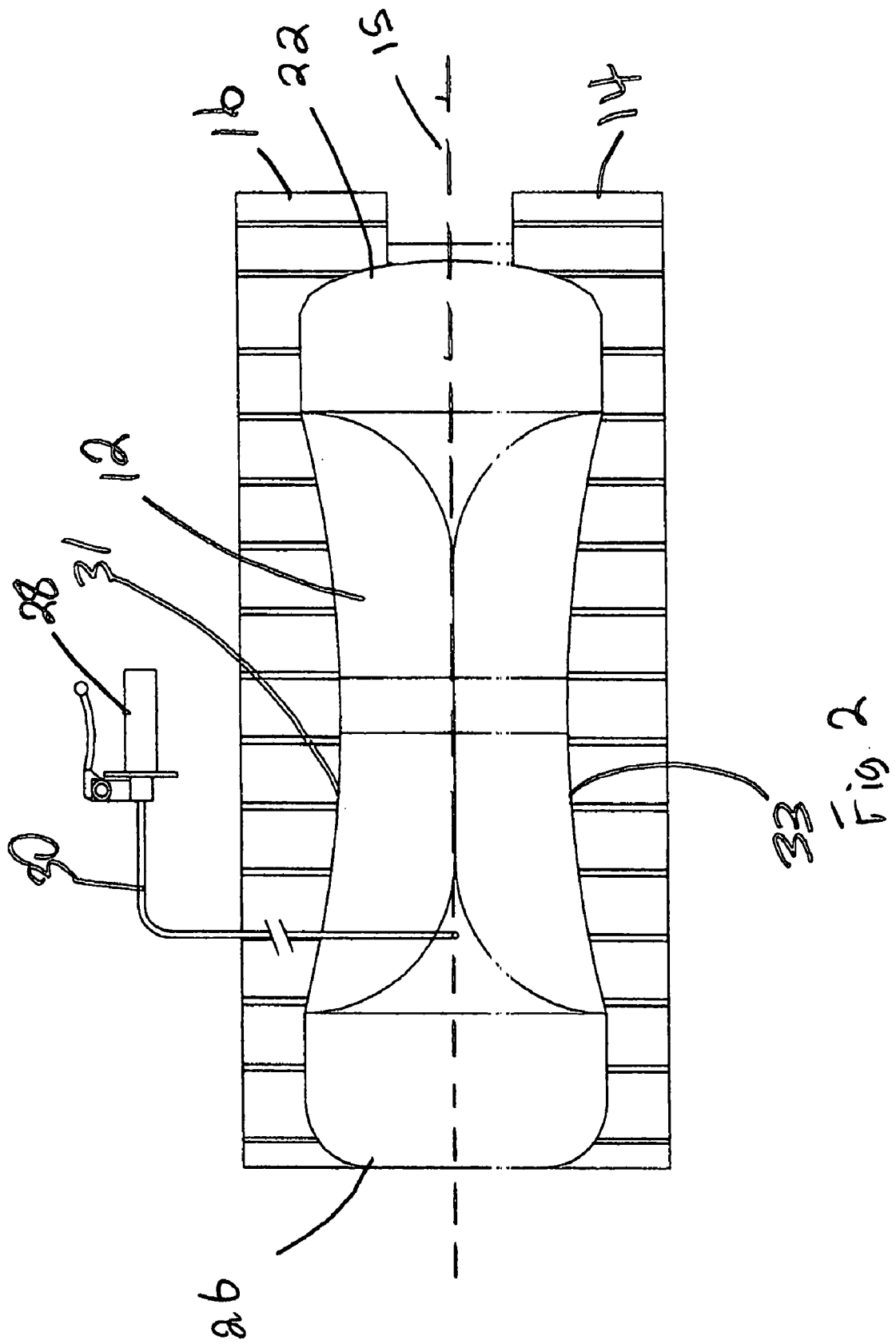
FIG. 2 is a top plan view of the vehicle shown in FIG. 1.
Figure 7:
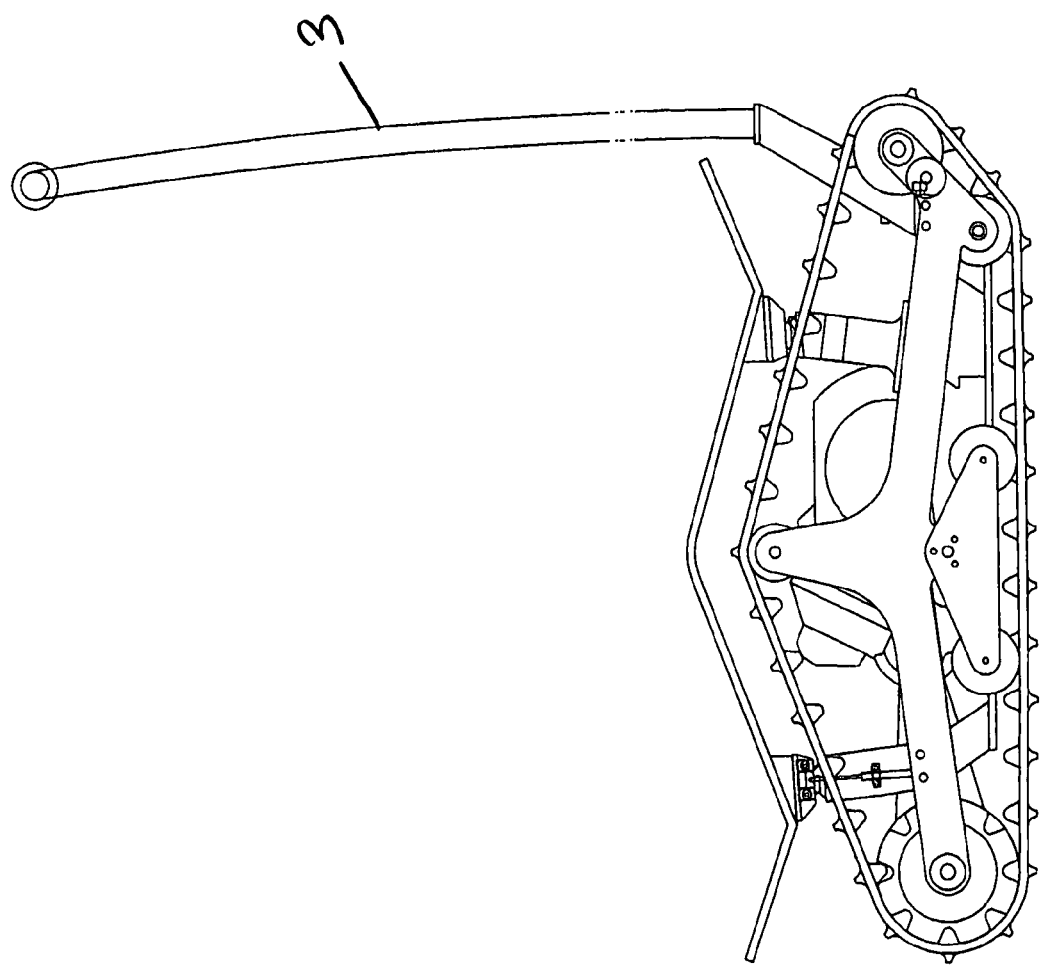
FIG. 7. is a side view of the vehicle showing the handle portion.

Referring firstly to FIG. 1, a vehicle made in accordance with the present invention, shown generally as item 10, consists of a platform 12, a pair of caterpillar type tracks 14 and 16, and a drive motor 18 mounted to a housing 20. Platform 12 has forward upraised portion 22, rear upraised portion 26 and central portion 24. Throttle control 28 is coupled to vehicle 10 by cable 30 and is used to control motor 18. Motor 18, right track 14 and left track 16 are mounted to housing 20 such that the motor is positioned between the tracks and substantially in the center of the vehicle. Tracks 14 and 16 are preferably made of a fiber reinforced polymer material such as rubber. As better seen in FIG. 2, tracks 14 and 16 are quite wide and extend beyond the width of platform 12 to ensure that the vehicle has a very wide and stable footing. Platform 12 has right side edge 33, left side edge 31 and long axis 15. The vehicle may also be provided with a handle (see item 3 in FIG. 7) upon which throttle controls may be placed.

Figure 3:
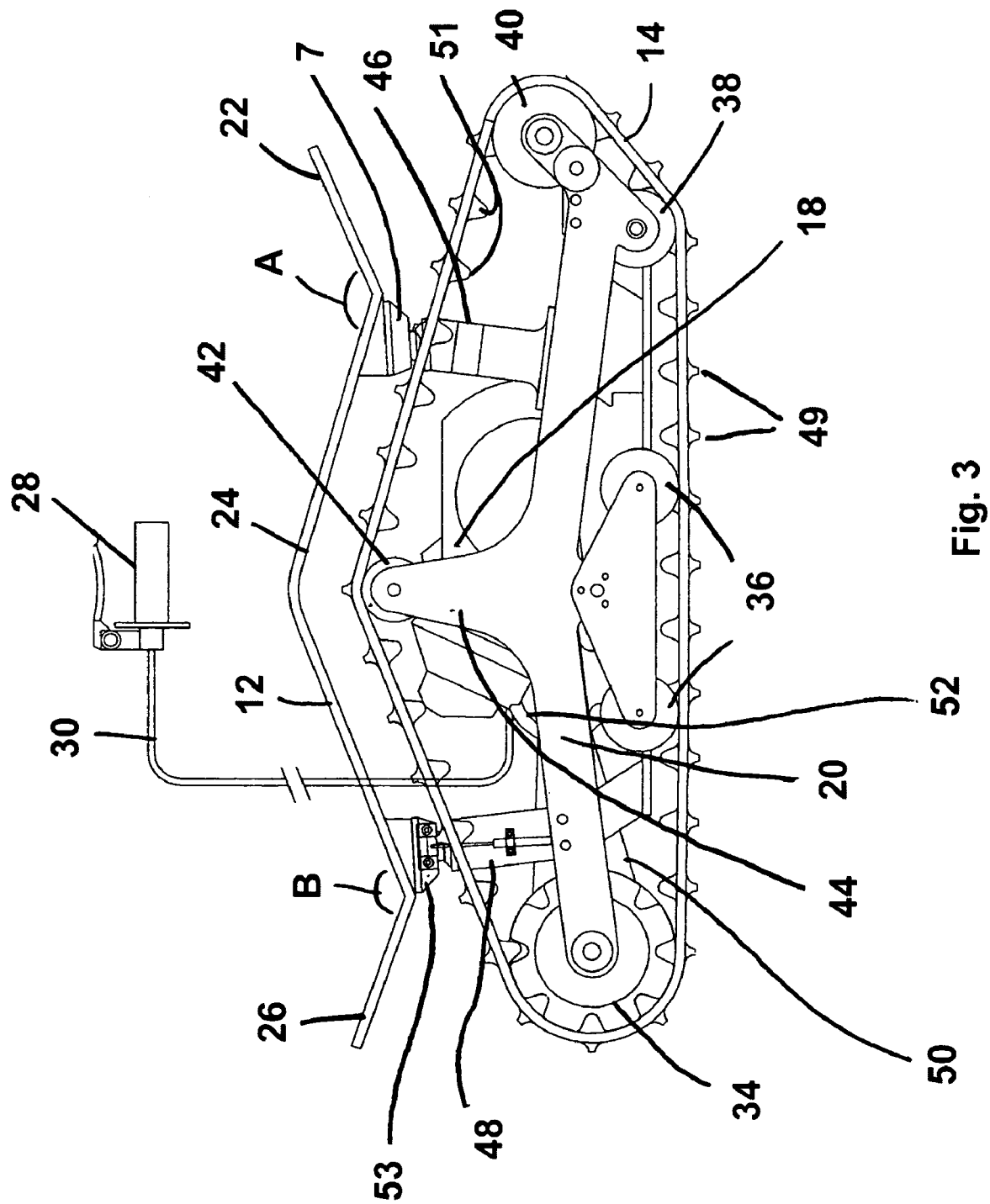
FIG. 3 is a side view of the vehicle shown in FIG. 1.

Referring now to FIG. 3, the tracks of the vehicle will now be discussed with reference to the right side of the vehicle upon which right track 14 is mounted. It will be appreciated that all of the features shown on the right side of the vehicle have their mirror image equivalents on the left side of the vehicle. Track 14 is driven by a right track drive which includes drive wheel 34 which is in turn driven by chain 50 which is coupled to transmission 52 which is in turn coupled to motor 18. Track 14 is looped around roller wheels 36, 38, 40 and 42 as well as drive wheel 34. Roller 42 is mounted to housing extension 44 which enables track 14 to pass over motor 18. Track 14 is a standard flexible track of the type used for snow mobiles and the like and is provided with a plurality of traction elements 49 and aligning members 51. Rollers 36, 38, 40 and 42 are standard track rollers configured to receive aligning members 51 so as to ensure that the track does not accidentally dislodge from the rollers.

Figure 6A:
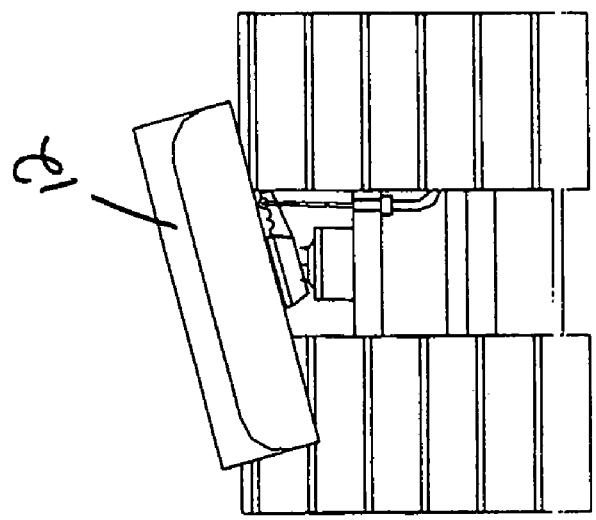
FIG. 6a. is a front view of the vehicle shown in FIG. 1 showing the platform in its first and position.
Figure 6B:
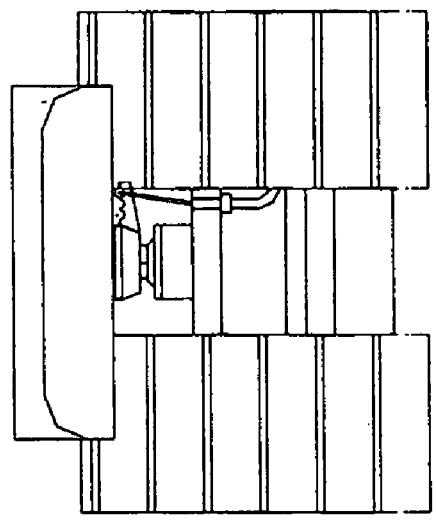
FIG. 6b. is a front view of the vehicle shown in FIG. 1 showing the platform midway between its first and second positions.
Figure 6C:
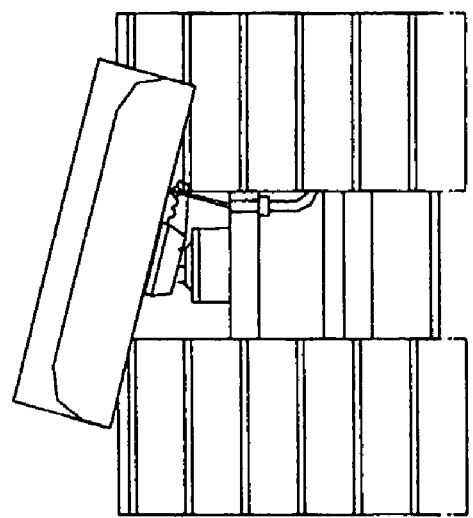
FIG. 6c. is a front view of the vehicle shown in FIG. 1 showing the platform in its second position.

As mentioned above, platform 12 has forward section 22, central portion 24 and rear portion 26. Forward portion 22 is upraised and at angle A to portion 24, with angle A being greater than 90°. Likewise, rear portion 26 is upraised and at angle B to portion 24, with angle B being greater than 90°. Forward portion 22 and rearward portion 26 act as a front and rear foot rest permitting the user to place his feet (not shown) on the forward and rearward portion when the user mounts the vehicle such that the central portion 24 is between the users legs. Central portion 24 is arched such that it clears track 14 and provides room for motor 18. Motor 18 is centrally mounted on the housing such that motor 18 is below central portion 24 and between the tracks. Platform 12 is mounted to housing 12 by front support strut 46 and rear support strut 48 via pivoting connectors 7 and 53. Pivoting connectors permit platform 12 to be selectively tilted between a first position wherein the right side of the platform is below the left side of the platform (see FIG. 6*a*) and a second position wherein the left side of the platform is lower than the right side of the platform (see FIG. 6*c*). Connectors 7 and 53 are spring biased such that the platform is biased towards a horizontal position where both left and right sides of the platform are equal distant to the housing (see FIG. 6*b*).

Figure 4:
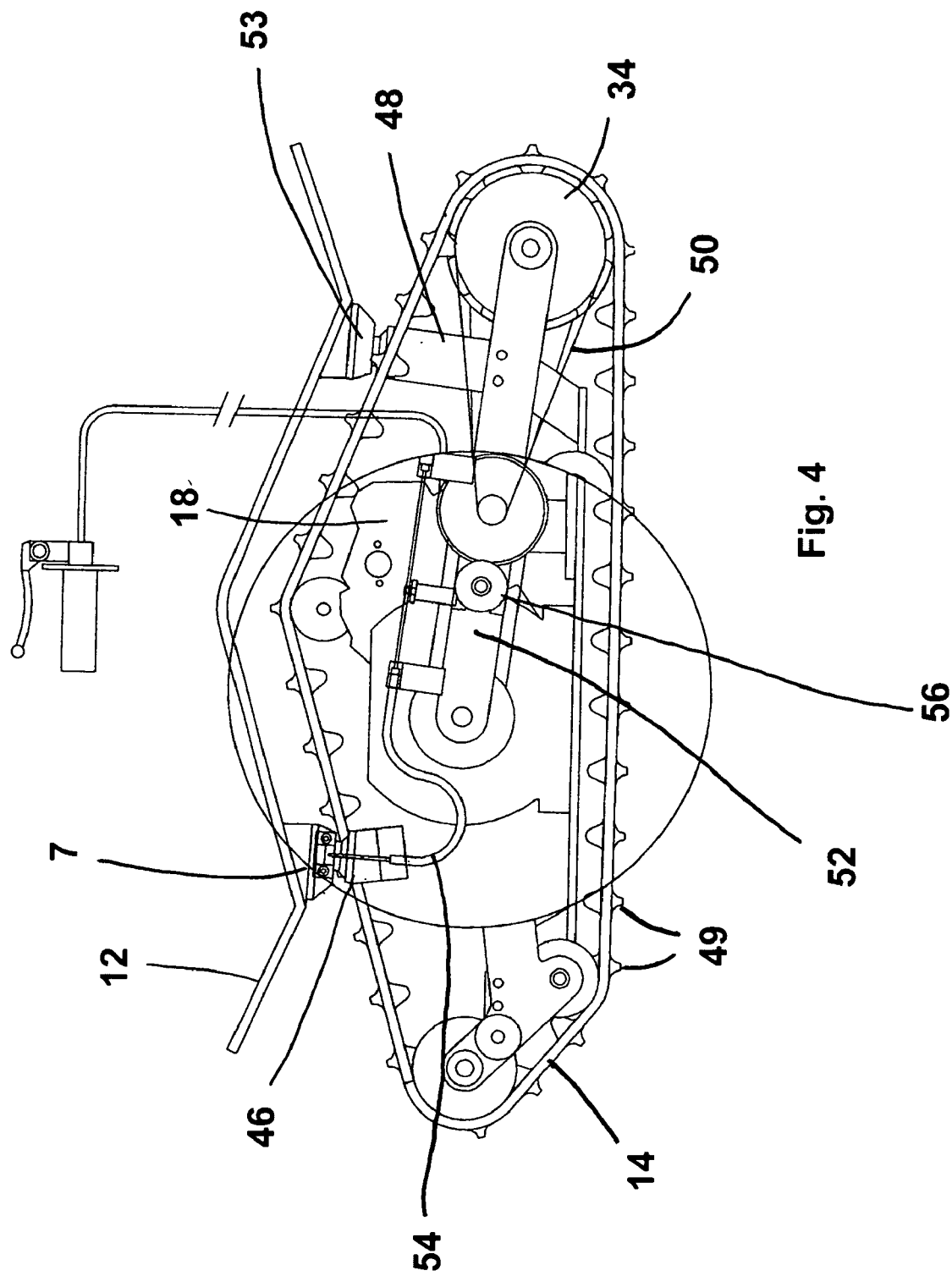
FIG. 4 is a side view of the vehicle shown in FIG. 1 with part of the housing removed to show details of the interior of the vehicle.

Referring now to FIG. 4, track 14 is driven by a drive mechanism consisting of drive wheel 34, chain 50, and transmission 52 which is in turn powered by motor 18. Transmission 52 is configured to drive both the left and right tracks. Transmission 52 is capable of steering the vehicle by selectively driving one track faster than the other. As will be further explained below, transmission 52 comprises a pair of continuously variable transmissions, one for each track, which can be selectively activated to drive the tracks at the same speed or with one track faster than the other. Transmission 52 is selectively operateable between a left drive bias mode, wherein the left track is driven faster than the right track, and a right drive bias mode, wherein the right track is driven faster than the left track. Differential 56 selectively operates transmission 52 between its left and right biased modes by moving between a first and second position, respectively. Differential 52 is coupled to platform 12 via tension cable 54. Cable 54 moves in response to the tilting of platform 12 which in turn moves differential 56 between its first and second position, which in turn operates the transmission between its left bias and right bias modes such that when the platform tilts to the right, the transmission is operated towards its left drive bias and when the platform is tilted to the left, the transmission is operated towards its right drive bias. Preferably cable 54 is spring biased to ensure that it is always under tension to ensure that the tilting motion of platform 12 is accurately translated into the shifting between right and left drive biases.

Figure 8:
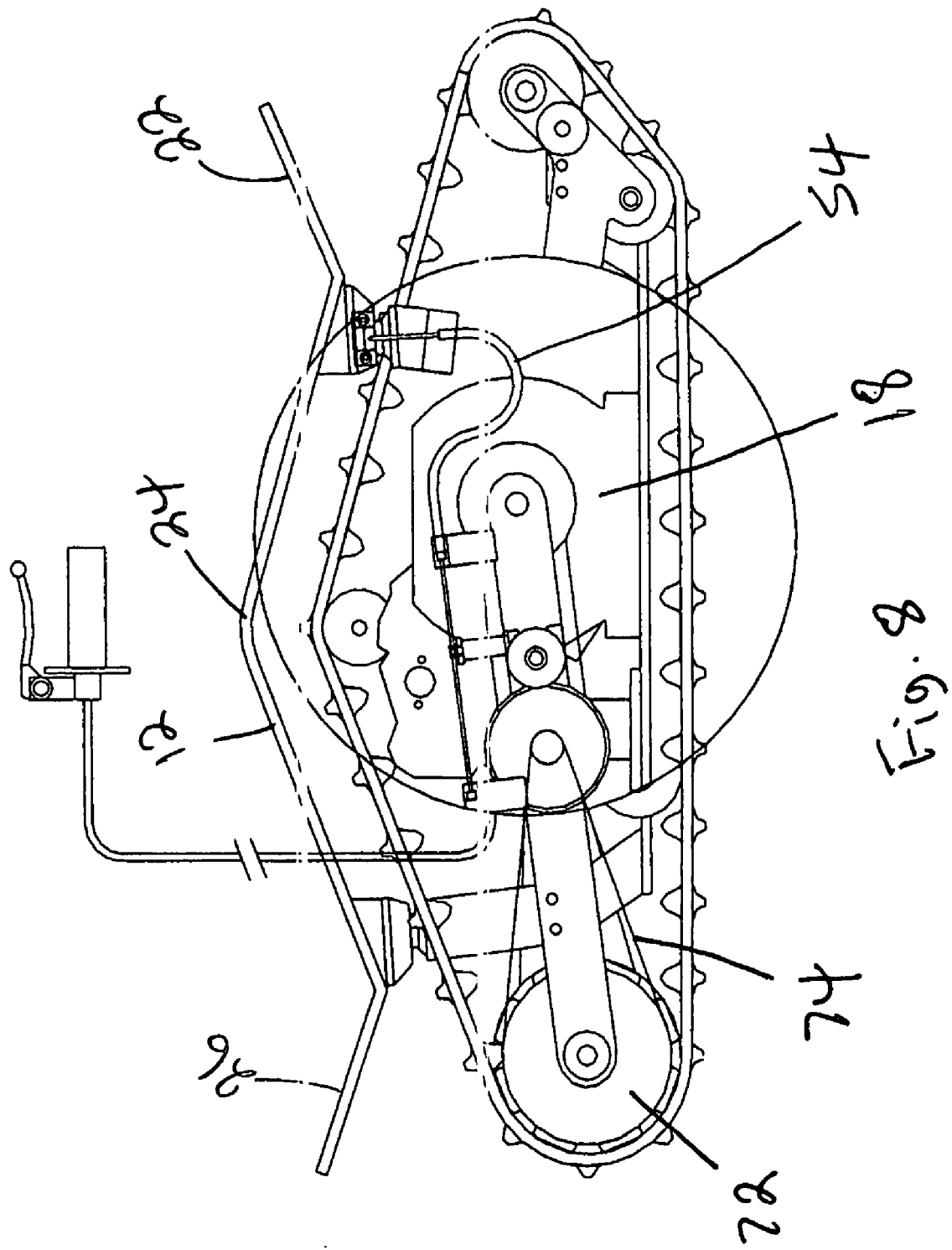
FIG. 8. is a side view of the vehicle shown in FIG. 1 with part of the housing removed to show details of the interior of the vehicle.

Referring now to FIG. 5, transmission 52 consists of two parallel continuously variable transmissions 58 and 60 corresponding to the right track drive and the left track drive, respectively. Right track drive 58 consists of pulley 62, belt 64, pulley 66, cog 72 and drive chain 74. Pulley 66 is a variable diameter pulley consisting of opposing cones 68 and 70. Bringing cones 68 and 70 together has the effect of increasing the effective diameter of the pulley. Pulley 62 is coupled to motor 18 and pulley 66 is coupled to cog 72. Increasing the diameter of pulley 66 has the effect of slowing down the pulley which in turn slows down cog 72 and drive chain 74, which in turn slows down the right track. Left track drive 60 consists of pulley 76, belt 78, variable diameter pulley 80, cog 82 and drive chain 50. Variable diameter pulley is analogous to pulley 66 and includes opposed cones 84 and 86. Pulleys 80 and 66 are coaxially aligned and adjacent one another such that cones 70 and 84 are adjacent one another. Both cones 70 and 84 are physically coupled to differential 56. Differential 56 consists of a gear like member 96 which is has a groove which is dimensioned to engage both cones 70 and 84 simultaneously. Member 96 is rotatably mounted to shaft 94 which is coupled to cam 92 and is movable between a first position in the direction of arrow 88 and a second position in the direction of arrow 90. Cam 92 is in turn coupled to cable 54. Moving cable 54 causes cam 92 to move which in turn moves member 96 in either direction 88 or direction 90. When member 96 is moved in direction 88, the diameter of pulley 66 increases and the diameter of pulley 80 decreases which in turn causes drive chain 74 to slow down and drive chain 50 to speed up, corresponding to a left drive bias. When member 96 is moved in direction 90, the diameter of pulley 66 decreases and the diameter of pulley increases which in turn causes drive chain 74 to speed up and drive chain 50 to slow down, corresponding to a right drive bias. Hence, the transmission and differential can be selectively operated between a left and right drive bias simply by moving cable 54. FIG. 8 shows the right side of the vehicle with details of the right drive mechanism such as drive chain 74 and cog 72.

The present invention has several advantages over the prior art. Firstly, the placement of the foot rests 22 and 26 at an angle on opposite sides of board 12 permit the user to precisely control the tilting of the board while minimizing the chance that the user will lose his balance. Also, the positioning of the motor, gas tank, transmission and other components between the tracks and below the board permit the unit to have a lower center of gravity, permitting a more stable ride. The use of continuously variable transmissions permit the user to smoothly steer the vehicle. Finally, by coupling the transmissions to the tilting board permits the user to operate and steer the vehicle using vary natural movements, analogous to the shifting of the user's body weight used to operate a skateboard or a snow board. By tilting the board to the right or left by shifting the user's body weight, the vehicle can execute sharper turns with less likelihood of the user falling off the vehicle.

A specific embodiment of the present invention has been disclosed; however, several variations of the disclosed embodiment could be envisioned as within the scope of this Therefore, what is claimed is:

1. A vehicle comprising:
   a housing;
   a platform mounted on top of the housing, the platform having a right and left side and a central axis, the platform being pivotally mounted to the housing along the axis and pivotally movable between a first position wherein the right side of the platform is below the left side of the platform and a second position wherein the left side of the platform is below the right side of the platform;
   a pair of parallel right and left tracks mounted to the housing below the platform, the right track being coupled to a right track drive and the left track being coupled to a left track drive, the right and left track drives being operatively coupled to the platform such that when the platform is pivoted towards its first position, the left track is driven faster and the right track is driven slower, and when the platform is pivoted towards its second position, the right track is driven faster and the left track is driven slower, the platform being biased towards a central position wherein the left and right drives operate at the same speed.

2. The vehicle of claim 1 wherein the right and left track drives are coupled to a single motor, the motor being mounted to the housing below the platform and between the tracks.

3. The vehicle of claim 2 wherein the platform is mounted to the frame by front and rear support struts, the front and rear support struts being pivotally mounted to the platform along the axis of the platform.

4. The vehicle of claim 3 wherein the platform has a forward upraised section and a rearward upraised section and a central portion between the forward and rearward sections, the forward and rearward upraised sections extending at an acute angle from the central portion.

5. The vehicle of claim 4 wherein the forward support strut is mounted to the platform at a point on the platform adjacent the forward upraise section and wherein the rearward support strut is mounted to the platform at a point on the platform adjacent the rearward upraised section.

6. The vehicle of claim 5 wherein the central portion of the platform is arched upwards such that the platform has a substantially W shaped profile in long section.

7. The vehicle of claim 2 wherein right track drive means and the left track drive means each comprise continuously variable transmissions, the continuously variable transmissions being coupled to a differential, the differential selectively operative between a right drive bias wherein the right drive means is driven faster than the left drive means and a left drive bias wherein the left drive means is driven faster than the right drive means, the differential being operatively coupled to the platform such that when the platform is moved towards its first position, the differential is operated towards its left drive bias and when the platform is moved towards its second position, the differential is operated towards its right drive bias.

8. The vehicle of claim 7 wherein the right and left continuously variable transmissions comprise first and second pulleys, respectively, the first and second pulleys having selectively variable diameters, the relative diameters of the first and second pulleys being selected by the differential.

9. The vehicle of claim 8 wherein the first and second pulleys comprise a first and second pair of opposing cones, respectively, the first and second pulleys being coaxially aligned and adjacent to one another such that one cone of each pulley are adjacent, and wherein the differential comprises a member physically coupled to said one cone of each pulley, the differential being selectively movable between a first and second position corresponding to the differential's left and right biases, respectively.

10. The vehicle of claim 9 wherein the member is coupled to the platform by a cable, the cable moving the member between the member's first and second position in response to the movement of the platform between the platform's first and second positions, respectively.

11. The vehicle of claim 6 wherein the motor is mounted beneath the central section of the platform.

12. The vehicle of claim 4 wherein right track drive means and the left track drive means each comprise continuously variable transmissions, the continuously variable transmissions being coupled to a differential, the differential selectively operative between a right drive bias wherein the right drive means is driven faster than the left drive means and a left drive bias wherein the left drive means is driven faster than the right drive means, the differential being operatively coupled to the platform such that when the platform is moved towards its first position, the differential is operated towards its left drive bias and when the platform is moved towards its second position, the differential is operated towards its right drive bias.

13. The vehicle of claim 12 wherein the right and left continuously variable transmissions comprise first and second pulleys, respectively, the first and second pulleys having selectively variable diameters, the relative diameters of the first and second pulleys being selected by the differential.

14. The vehicle of claim 13 wherein the first and second pulleys comprise a first and second pair of opposing cones, respectively, the first and second pulleys being coaxially aligned and adjacent to one another such that one cone of each pulley are adjacent, and wherein the differential comprises a member physically coupled to said one cone of each pulley, the differential being selectively movable between a first and second position corresponding to the differential's left and right biases, respectively.

15. The vehicle of claim 14 wherein the member is coupled to the platform by a cable, the cable moving the member between the member's first and second position in response to the movement of the platform between the platform's first and second positions, respectively.

16. A vehicle comprising:
   a housing;
   a platform mounted on top of the housing, the platform having a front and a rear end, a right and left side and a central axis, the platform being pivotally mounted to the housing along the axis and pivotally movable between a first position wherein the right side of the platform is below the left side of the platform and a second position wherein the left side of the platform is below the right side of the platform;
   the platform having a forward portion, a rearward portion and middle portion between the two, the middle portion being arched upwardly;
   a pair of parallel right and left tracks mounted to the housing below the platform, the right track being coupled to a right track transmission and the left track being coupled to a left track transmission, the right and left track transmissions being coupled to a motor for driving the transmissions, the right and left track transmissions being operatively coupled to the platform such that when the platform is pivoted towards its first position, the left track is driven faster and the right track is driven slower, and when the platform is pivoted towards its second position, the right track is driven faster and the left track is driven slower, the platform being biased towards a central position wherein the left and right drives operate at the same speed;

the motor being mounted to the housing below the middle portion of the platform and between the tracks.

17. The vehicle of claim 16 wherein the left and right transmissions are continuously variable transmissions capable of driving their respective tracks at different speeds, and further comprising a differential coupled to the right and left transmissions for controlling the relative speed of the tracks, the differential operating between a right bias wherein the right track is driven faster than the left track and a left bias wherein the left track is driven faster than the right track, the differential being operatively coupled to the platform.

18. The vehicle of claim 17 wherein the right transmission comprises a first pulley having a variable diameter coupled to the motor by a first belt, the first pulley in turn being coupled to the right track and wherein the left transmission comprises a second pulley having a variable diameter coupled to the motor by a second belt, the second variable diameter pulley in turn being coupled to the left track, and wherein the differential controls the relative diameters of the first and second pulleys.

19. The vehicle of claim 18 wherein the first and second pulleys comprise a first and second pair of opposing cones, respectively, the first and second pulleys being coaxially aligned and adjacent to one another such that one cone of each pulley are adjacent, and wherein the differential comprises a member physically coupled to said one cone of each pulley, the differential being selectively movable between a first and second position corresponding to the differential's left and right biases, respectively.

20. The vehicle of claim 19 wherein the member is coupled to the platform by a cable, the cable moving the member between the member's first and second position in response to the movement of the platform between the platform's first and second positions, respectively.

* * * * *